United States Patent [19]
Wirtz et al.

[11] Patent Number: 5,533,177
[45] Date of Patent: Jul. 2, 1996

[54] METHOD FOR DETECTING AND ESTIMATING THE SPATIAL POSITION OF OBJECTS FROM A TWO-DIMENSIONAL IMAGE

[75] Inventors: Brigitte Wirtz, Holzkirchen; Chistoph Maggioni, Munich, both of Germany

[73] Assignee: Siemens Aktiengesellschaft, Munich, Germany

[21] Appl. No.: 39,352

[22] PCT Filed: Oct. 2, 1991

[86] PCT No.: PCT/DE91/00775

§ 371 Date: Apr. 22, 1993

§ 102(e) Date: Apr. 22, 1993

[87] PCT Pub. No.: WO92/08204

PCT Pub. Date: May 14, 1992

[30] Foreign Application Priority Data

Oct. 24, 1990 [DE] Germany ............... 40 33 857.6

[51] Int. Cl.⁶ .................................................. G06F 3/14
[52] U.S. Cl. ............................................. 395/119; 395/118
[58] Field of Search ........................... 395/118, 119, 395/120, 124, 125, 127

[56] References Cited

U.S. PATENT DOCUMENTS

| | | | |
|---|---|---|---|
| 4,185,270 | 1/1980 | Fischer et al. | 340/146.3 |
| 5,068,808 | 11/1991 | Wake | 395/119 |
| 5,129,054 | 7/1992 | Alstad et al. | 395/119 X |
| 5,307,455 | 4/1994 | Higgins et al. | 395/118 X |

OTHER PUBLICATIONS

"Global Shape Recognition of 3–D Objects Using a Differential Library Storage", by F. P. Kuhl et al, Computer Vision Graphics and Image Processing, vol. 27, No. 1, Jul. 1984, pp. 97–114.

"Pattern Analysis With Adaptive Logic Networks", by Y. Guoqing et al, Proc. of the IEEE Conference on Systems, Man, and Cybernetics, Aug. 1988, pp. 1174–1179.

"Feature Maps Based Weight Vectors For Spatiotemporal Pattern Recognition With Neural Nets", by Matthew M. Yen et al, Jun. 17–19, 1990, pp. II–149–II–155.

"Clustering, Taxonomy, and Topological Maps of Patterns", by T. Kohonen, Proc. of the 6th Intern. Conf. on Pattern Recognition, Oct. 19–22, 1982, pp. 114–128.

"A Connectionist Approach to Multiple–View Based 3–D Object Recognition", by Wei–Chung Lin et al, Int. Joint Conference on Neural networks, Jun. 17–21, 1990, pp. 835–844.

"Three–Dimensional Object Recognition from Single Two–Dimensional Images", by David G. Lowe, Elsevier Science Publishers, Artificial Intelligence 31, (1987) pp. 355–395.

"The Three Point Perspective Pose Estimation Problem", by Robert M. Haralick, Intelligent Systems Laboatory Department of Electrical Engineering, FT–10, University of Washington, Seattle, WA, Jun. 7, 1990, pp. 1–16.

Primary Examiner—Mark K. Zimmerman
Assistant Examiner—Cliff N. Vo
Attorney, Agent, or Firm—Hill, Steadman & Simpson

[57] ABSTRACT

Use is made of an adaptive vector quantization in order to detect three-dimensional objects and to estimate their position parameters in space from two-dimensional coordinates of feature points which have been obtained by digital image preprocessing methods from a two-dimensional image of the three-dimensional object. For this purpose, a special learning method and a special method for object detection and for position estimation are specified. The method can be applied in wide fields of video-based production automation.

27 Claims, 2 Drawing Sheets

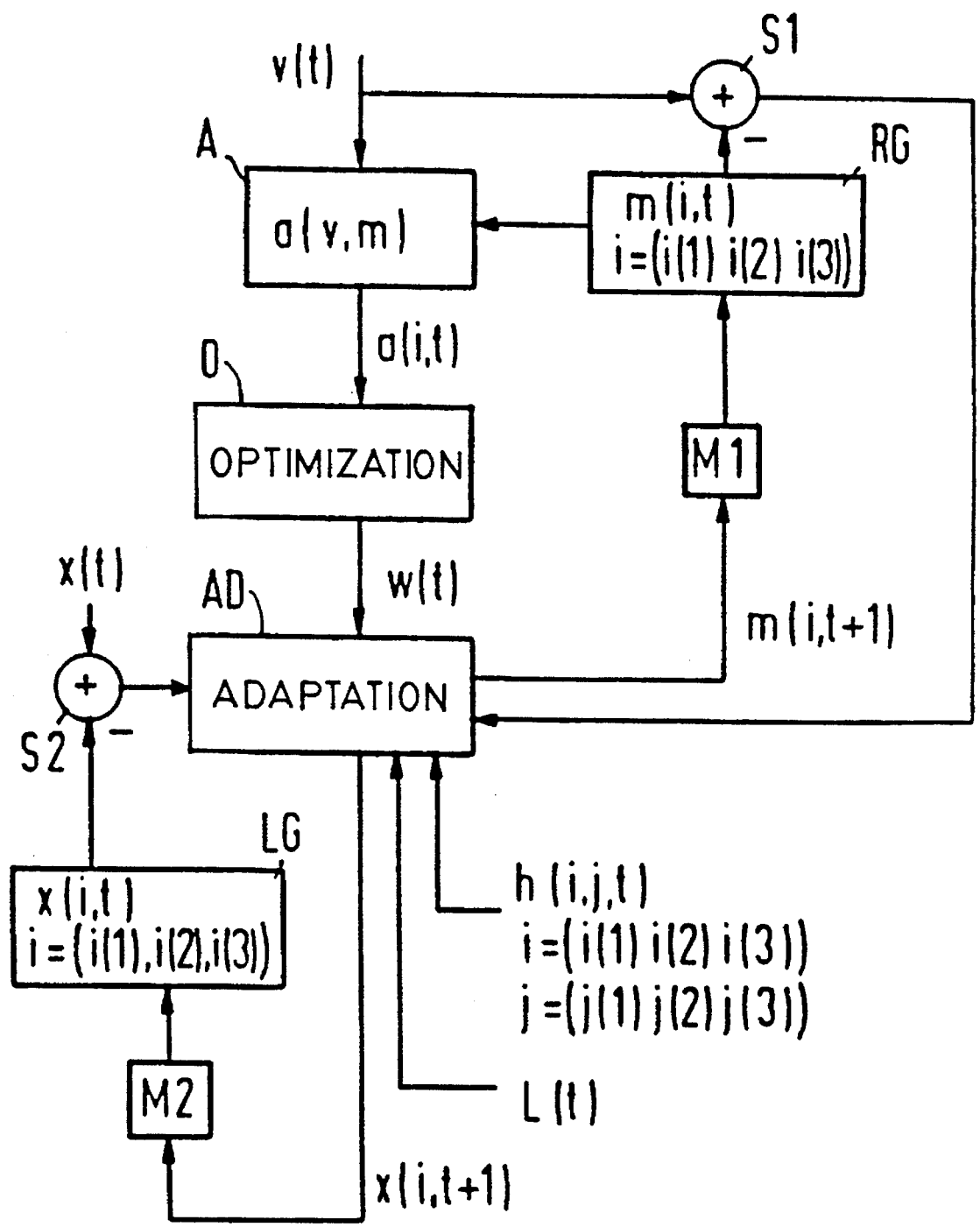

METHOD FOR DETECTING AND ESTIMATING THE SPATIAL POSITION OF OBJECTS FROM A TWO-DIMENSIONAL IMAGE

BACKGROUND OF THE INVENTION

Methods for mechanized detection of three-dimensional objects and their position in space are of fundamental importance in most applications of mechanized image processing and of image interpretation in fields of application such as robotics and production automation. In many of these cases of application, depth data is not available, and also cannot be determined with the aid of stereo images or temporal image sequences in which the object movement or the camera movement could be evaluated in order to obtain depth data. In such cases, it is necessary to use a single two-dimensional image of the object to be detected in order to reconstruct the object identity and its position in space from the two-dimensional image. For this purpose, it is generally necessary to use models for the objects to be detected and a model for the imaging process. For reasons of simplification, objects are frequently modelled with the aid of a corner point and edge lines. The optical imaging of space into the image plane can be approximated in many cases with sufficient accuracy, for example by central projection. The technical problem in detecting and estimating the position parameters of three-dimensional objects in space from a two-dimensional image, frequently also referred to as the n-point perspective problem, consists in determining the position and spatial arrangement of a three-dimensional object from n feature points which have been found with the aid of suitable preprocessing methods in a two-dimensional image of the object to be detected. Examples for such feature points are, inter alia, images of object points or images of other prominent points on the object surface.

The literature discloses various methods for the positional estimation of three-dimensional objects in space. Essentially, it is possible to distinguish two types of method: on the one hand, there are approaches to the analytical solution of the n-point perspective problem which concern themselves with the minimum number of correspondences which are required in order to solve the perspective problem of rigid objects, that is to say the problem of assignment between object points and feature points in the image plane. In these types of method, the relationship, which models the image, between points in space and points in the image plane, for example central projection, is used to set up a system of equations. Depending on the number of feature points in the image plane, this system of equations can be underdetermined, uniquely solvable or overdetermined. These methods therefore generally use a subset of all the available feature points in the image plane, which lead to a uniquely solvable and well-conditioned system of equations. Such a method is described, for example, in the publication by R. M. Haralick, "Using Perspective Transformations in Scene Analysis", Computer Vision, Graphics and Image Processing 13, 1980, pages 191–221. Methods of this type generally lead to overdetermined or underdetermined systems of equations, and therefore require preprocessing of the image with the aim of selecting a suitable set of feature points, and are generally not very robust with respect to disturbances.

A second type of method exploits the iterative solution of overdetermined systems of equations with the aid of nonlinear minimization methods. In this case, a cost function which is determined by means of correspondences previously found between image features and model parameters is minimized. An example of this second type of method is described in the publication by D. G. Lowe "Three-Dimensional Object Recognition from Single Two-Dimensional Images", Artificial Intelligence 31, 1987, pages 355–395. This second type of method is certainly far less sensitive to disturbances, but like the first type of method has the disadvantage that a nonlinear analytical model of the optical imaging process is required and must be processed using numerical methods.

SUMMARY OF THE INVENTION

It is the object of the invention to specify a method which solves the problems specified above and avoids the disadvantages of the known methods. Moreover, the invention has the aim of specifying a method by means of which not only the position of a known object can be estimated from a two-dimensional image, but by means of which it is possible to detect an unknown object belonging to a prescribed set of known objects and to estimate its spatial position. These objects are achieved by means of a method for estimating position parameters of an object in space from a two-dimensional image, and by means of a method for object detection in conjunction with simultaneous estimation of situation parameters of the object in space from a two-dimensional image.

The various methods of the present invention are described in general terms as follows.

A method of the present invention for estimating position parameters of an object in space from a two-dimensional image has the following features:

a) two totalities, indexable with whole numbers i, of reference patterns $m(i)=(m(i, 1), \ldots, m(i, M))$ and associated position parameters $x(i)=(x(i, 1), \ldots, x(i, N))$ are prescribed;

b) a master vector $v=(v(1), \ldots, v(M))$ in the form of $v(k)=(p(k), q(k))$ from which output values $a(i)=a(v,m(i))$ are calculated for each index i with the aid of the reference patterns $m(i)$ is formed from two-dimensional coordinates $p(k)$, $q(k)$ of feature points in the image;

c) the desired position parameters of the object belong to the index w with optimum output value $a(w)$.

A method of the present invention for object detection in conjunction with simultaneous estimation of position parameters of an object in space from a two-dimensional image has the following features:

a) two totalities, indexable with whole numbers i, of reference patterns $m(i)=(m(i, 1), \ldots, m(i, M))$ and associated interpretations $z(i)=(z(i, 1), \ldots, z(i, N))$ are prescribed;

b) a master vector $v=(v(1), \ldots, v(M))$ in the form $v(k)=(p(k), q(k))$ from which output values $a(i)=a(v,m(i))$ are calculated for each index i with the aid of the reference patterns $m(i)$ is formed from two-dimensional coordinates $p(k)$, $q(k)$ of feature points in the image;

c) the desired object identification and the associated position parameters are yielded as components of the interpretations $z(w)$ relating to the index w with optimal output value $a(w)$.

A further method of the present invention for estimating position parameters of an object in space from a two-dimensional image has the following features:

a) two totalities, indexable with whole numbers i, of reference patterns $m(i)=(m(i, 1), \ldots, m(i, M))$ and associated position parameters $x(i)=(x(i, 1), \ldots, x(i, N))$ are prescribed;

b) each index i is assigned a point (i(1), i(2), i(3)) on a grid in three-dimensional space in a reversible unique fashion;
c) a master vector v=(v(1), ..., v(M)) from which output values a(i)=a(v,m(i)) are calculated for each index i with the aid of the reference patterns m(i) is formed from two-dimensional coordinates of feature points in the image;
d) the index or grid point w with optimum output value a(w) is determined;
e) the optimum of the function $$A(u,b)=a(v,b \cdot m(w)+(1-b) \cdot m(u))$$

of the real variable b, where $0 \leq b \leq 1$, is determined for all grid points u from a prescribed environment U of the grid point w;
f) from among all the grid points u of the environment U of the grid point w that grid point opt is determined for which it holds that:
  A(opt, b(opt)) is optimal among all A(u,b(u)), b(u) denoting the position of the optimum of A(u,b) as a function of b in the interval $0 \leq b \leq 1$;
g) the desired position parameters x of the object are yielded with the aid of the relationship $$x=b(opt) \cdot x(w)+(1-b(opt)) \cdot x(opt)$$

as a convex linear combination of the position parameters of two grid points.

Another method of the present invention for estimating position parameters of an object in space from a two-dimensional image has the following features:
a) two totalities, indexable with whole numbers i, of reference patterns m(i)=(m(i, 1), ..., m(i, M)) and associated position parameters x(i)=(x(i, 1), ..., x(i, N)) are prescribed;
b) each index i is assigned a point (i(1), i(2), i(3)) on a grid in three-dimensional space in a reversible unique fashion;
c) a master vector v=(v(1), ..., v(M)) from which output values a(i)=a(v,m(i)) are calculated for each index i with the aid of the reference patterns m(i) is formed from two-dimensional coordinates of feature points in the image;
d) the index or grid point w with optimum output value a(w) is determined;
e) for all grid points u from a prescribed environment U of the grid point w, numbers b(u, opt) and a number b(w, opt), where $0 \leq b(u, opt)$, $b(w, opt) \leq 1$, are determined, for which the function $$A(b(u), b(w)) = a \left( v, b(w) \cdot m(w) + \sum_{u \neq w} b(u) \cdot m(u) \right)$$

is optimum;
f) the desired position parameters x of the object are yielded with the aid of the relationship $$x = b(w, opt) \cdot x(w) + \sum_{u \neq w} b(u, opt) \cdot x(u)$$

as a convex linear combination of the position parameters x(w) and x(u).

A further method of the present invention for object detection in conjunction with simultaneous estimation of position parameters of the object in space from a two-dimensional image has the following features:

a) two totalities, indexable with whole numbers i, of reference patterns m(i)=(m(i, 1), ..., m(i, M)) and associated interpretations z(i)=(z(i, 1), ..., z(i, N)) are prescribed, the components of the interpretations corresponding to an object recognition and to position parameters of the object;
b) each index i is assigned a point (i(1), i(2), i(3)) on a grid in three-dimensional space in a reversible unique fashion;
c) a master vector v=(v(1), ..., v(M)) from which output values a(i)=a(v,m(i)) are calculated for each index i with the aid of the reference patterns m(i) is formed from two-dimensional coordinates of feature points in the image;
d) the index or grid point w with optimum output value a(w) is determined;
e) the optimum of the function $$A(u,b)=a(v,b \cdot m(w)+(1-b) \cdot m(u))$$

of the real variable b, where $0 \leq b \leq 1$ is determined for all grid points U from a prescribed environment U of the grid point w;
f) from among all the grid points u of the environment U of the grid point w that grid point opt is determined for which it holds that:
  A(opt, b(opt)) is optimal among all A(u,b(u)), b(u) denoting the position of the optimum of A(u,b) as a function of b in the interval $0 \leq b \leq 1$;
g) the desired object identification is yielded from the corresponding component of the interpretation z(w) relative to the index w with optimum output value a(w);
h) the desired position parameters z are yielded with the aid of the relationship $$z=b(opt) \cdot z(w)+(1-b(opt)) \cdot z(opt)$$

as a convex linear combination of the position parameters of two grid points.

Another method of the present invention for object detection in conjunction with simultaneous estimation of position parameters of an object in space from a two-dimensional image has the following features:
a) two totalities, indexable with whole numbers i, of reference patterns m(i)=(m(i, 1), ..., m(i, M)) and associated interpretations z(i)=(z(i, 1), ..., z(i, N)) are prescribed, the components of the interpretations corresponding to an object recognition and to position parameters of the object;
b) each index i is assigned a point (i(1), i(2), i(3)) on a grid in three-dimensional space in a reversible unique fashion;
c) a master vector v=(v(1), ..., v(M)) from which output values a(i)=a(v,m(i)) are calculated for each index i with the aid of the reference patterns m(i) is formed from two-dimensional coordinates of feature points in the image;
d) the index or grid point w with optimum output value a(w) is determined;
e) for all grid points u from a prescribed environment U of the grid point w, numbers b(u, opt) and a number b(w, opt), where $0 \leq b(u, opt)$, $b(w, opt) \leq 1$, are determined, for which the function $$A(b(u), b(w)) = a \left( v, b(w) \cdot m(w) + \sum_{u \neq w} b(u) \cdot m(u) \right)$$

is optimum;
f) the desired object identification is yielded from the corresponding components of the interpretation z(w) relative to the index w with optimum output value a(w);

g) the desired position parameters z are yielded with the aid of the relationship $$Z = b(w, opt) \cdot Z(w) + \sum_{u \neq w} b(u, opt) \cdot Z(u)$$

as a convex linear combination of the corresponding components of the interpretations Z(w) and Z(u).

A method of the present invention for adapting reference patterns for estimating position parameters of an object in space from a two-dimensional image has the following features:

a) two totalities, indexable with whole numbers i, of reference patterns m(i)=(m(i, 1), ..., m(i, M)) and associated position parameters x(i)=(x(i, 1), ..., x(i, N)) are prescribed and randomly distributed;
b) each index i is assigned a point (i(1), i(2), i(3)) on a grid in three-dimensional space in a reversible unique fashion;
c) for each instant t of the adaptation a learning rate L(t) is prescribed which decreases monotonically with time;
a coupling strength function h(i, j, t) is prescribed which assigns to two points (i(1), i(2), i(3)), (j(1), j(2), j(3)) on the grid in each case a coupling strength h which decreases monotonically with the spacing of the grid points and monotonically with time;
a training master vector v(t)=(v(1, t), ..., v(M, t)), which is formed from two-dimensional coordinates of feature points in the image, and position parameters XT(t)= (XT(1, t), ..., XT(N, t)) belonging to this training master vector are prescribed;
for each index i the instantaneous output values a(i, t)=a (v(t), m(i, t)) are calculated from the prescribed training master vector v(t) and the instantaneous reference patterns m(i, t)=(m(i, 1, t), ..., m(i, M, t));
the index w(t) with optimum output value a(w, t) is determined;
the reference patterns m(i, t) and the position parameters x(i, t) relating to each index i are adapted with the aid of the relationships $$m(i, t+1)=m(i, t)+L(t)\cdot h(i, w, t)\cdot(v(t)-m(i, t))$$

$$x(i, t+1)=x(i, t)+L(t)\cdot h(i, w, t)\cdot(XT(t)-x(i, t)).$$

A method of the present invention for adapting reference patterns for object detection in conjunction with simultaneous estimation of position parameters of an object in space from a two-dimensional image has the following features:

a) two totalities, indexable with whole numbers i, of reference patterns m(i)=(m(i, 1), ..., m(i, M)) and associated interpretations z(i)=(z(i, 1), ..., z(i, N)) are prescribed and randomly distributed, the components of the interpretations corresponding to an object detection and to position parameters of the object;
b) each index i is assigned a point (i(1), i(2), i(3)) on a grid in three-dimensional space in a reversible unique fashion;
c) for each instant t of the adaptation a learning rate L(t) is prescribed which decreases monotonically with time;
a coupling strength function h(i, j, t) is prescribed which assigns to two points (i(1), i(2), i(3)), (j(1), j(2), j(3)) on the grid in each case a coupling strength h which decreases monotonically with the spacing of the grid points and monotonically with time;
a training master vector v(t)=(v(1, t), ..., v(M, t)), which is formed from two-dimensional coordinates of feature points in the image, and interpretations ZT(t)=(ZT(1, t), ..., ZT(N, T)) belonging to this training master vector are prescribed;
for each index i the instantaneous output values a(i, t)=a (v(t), m(i, t)) are calculated from the prescribed training master vector v(t) and the instantaneous reference patterns m(i, t)=(m(i, 1, t), ..., m(i, M, t));
the index w(t) with optimum output value a(w, t) is determined;
the reference patterns m(i, t) and the interpretations z(i, t) relating to each index i are adapted with the aid of the relationships $$m(i, t+1)=m(i, t)+L(t)\cdot h(i, w, t)\cdot(v(t)-m(i, t))$$

$$z(i, t+1)=z(i, t)+L(t)\cdot h(i, w, t)\cdot(ZT(t)-z(i, t)).$$

In the last two above-described methods a learning rate L(t) can be used of the form $$L(t) = L(\text{start}) \cdot \exp\left( \frac{t}{t(\text{end})} \ln\left( \frac{L(\text{end})}{L(\text{start})} \right) \right)$$

with prescribed initial and final learning rates L(start) and L(end) respectively, up to the final instant t(end) of the adaptation. A coupling strength can be used function h(i, j, t) of the form $$h(i, j, t) = \exp\left( -\frac{\|i - j\|^2}{2 \cdot S^2(t)} \right) \text{ where}$$

$$S(t) = S(\text{start}) \cdot \exp\left( \frac{t}{t(\text{end})} \ln\left( \frac{S(\text{end})}{S(\text{start})} \right) \right)$$

and with prescribed initial and final ranges s(start) and s(end), respectively, up to the final instant t(end) of the adaptation.

The master vectors v=(v(1), ..., v(M)) in the form of v(k)=(p(k), q(k)) are formed from the two-dimensional coordinates p(k), q(k) of feature points k=1, ..., M.

The output values a(i) are calculated with the aid of the relationship $$a(v, m(i)) = \|v - m(i)\|^2 = \sum_{k=1}^{M} (v(k) - m(i, k))^2$$

from the master vector v and the reference patterns m(i), and in that minimum output values are optimal.

The output values a(i) are calculated with the aid of the relationship $$a(v, m(i)) = \sum_{k=1}^{M} g(v, k) \cdot (v(k) - m(i, k))^2$$

from the master vector v and the reference patterns m(i), the weights g(v, k) being a measure of the reliability of the values of the components v(k) of the master vector v, and minimum output values being optimal.

The output values a(i) are calculated with the aid of the relationship $$a(v, m(i)) = \sum_{k=1}^{M} m(i, k) \cdot v(k)$$

from the master vector v and the reference patterns m(i), and in that maximum output values are optimal.

Among the position parameters are rotational angles referred to three axes of a spatial coordinate system.

Since these methods do not use any kind of analytical models of the optical imaging process, nor yet any explicit object models, their application presupposes a learning process with the aid of suitable learning methods. The invention therefore also comprises a method for adapting reference patterns to the estimation of position parameters of an object in space from a two-dimensional image, and a method for adapting reference patterns to object recognition in conjunction with simultaneous estimation of position parameters of the object in space from a two-dimensional image. The method according to the invention is based on the method of adaptive vector quantization, which can also be formulated as a so-called Kohonen-network with the aid of concepts from the field of neuron networks (T. Kohonen, "Representation of Sensory Information in Self-Organizing Feature Maps, and Relation of these Maps to Distributed Memory Networks", Proc. SPIE Optical and Hybrid Computing, vol. 634, pages 248 to 259, 1986). In this case, there are formed from the two-dimensional coordinates of feature points in the image plane so-called master vectors which are compared with stored reference patterns which are also referred to in the language of neuron networks as weighting coefficients. Each reference pattern is in this case assigned an interpretation by means of which it is possible to draw conclusions directly concerning the position parameters of the object to be detected and concerning the object identity. The desired position parameters or the desired object identity are yielded in this case as an interpretation of that reference pattern which is most similar to the master vector representing the feature points of the image plane.

The accuracy and reliability of this mode of procedure can be further substantially improved when, instead of the interpretation of the reference pattern most similar to the master vector an estimate of position is carried out by reference pattern interpolation.

The correct or optimum assignment between reference patterns and interpretation or position parameters and object identities is found with the aid of a learning method, in which the totality of the reference patterns and interpretations is varied in steps under the influence of a large number of training master vectors, starting from an initial random selection. At the end of this learning process, the reference patterns represent the statistical distribution of the training patterns, and the structural characteristics of the objects to be detected are coded, in common with the structural characteristics of the optical imaging process, in the assignment between the reference patterns and interpretations.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 shows a flow diagram of the method for adaptation of reference patterns for estimating position parameters or for detecting objects in conjunction with simultaneous estimation of position parameters.

DESCRIPTION OF THE PREFERRED EMBODIMENT

The invention is explained in more detail below with the aid of a preferred exemplary embodiment.

For typical applications, for example in robotics, two-dimensional images of three-dimensional objects are generated with the aid of electronic cameras. In this case, the three-dimensional space is projected with the aid of optical imaging into a two-dimensional image plane. The structural characteristics of this optical imaging process depend on the optical characteristics of the camera used, and can generally be described sufficiently accurately by the mathematical model of central projection (also termed perspective projection). In central projection, each space point X, Y, Z is assigned a point p, q in the image plane as follows:

$$(p, q) = (f \cdot X/Z, f \cdot Y/Z) \qquad (1)$$

f denoting the focal length of the optical imaging system (Y. Shirai "Three-Dimensional Computer Vision", Springer-Verlag, Berlin, Heidelberg, New York, 1987, pages 11–13). The result of such optical imaging with the aid of an electronic camera is finally a two-dimensional projection of the three-dimensional object, which is present in a digital image memory.

Figure 1:
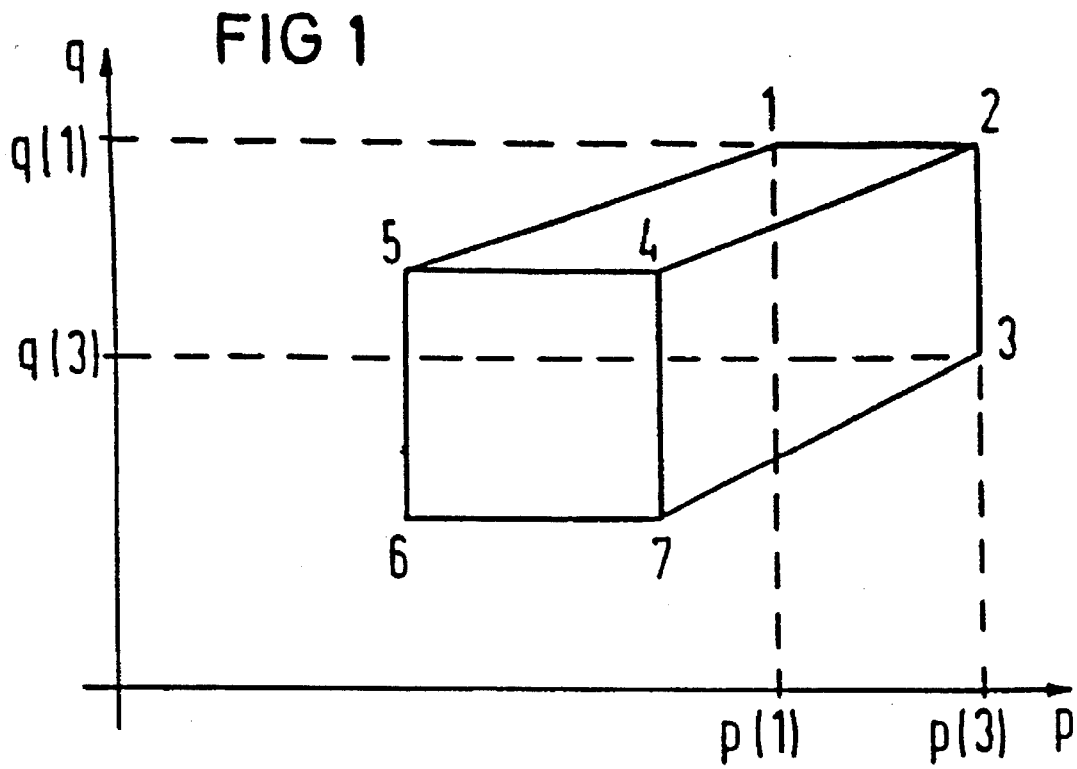
FIG. 1 shows a cuboid which is projected into the image plane and has the corner points 1, 2, . . . , 7 and the two-dimensional coordinates q(1), . . . , p(3) belonging to the corner points 1 and 3, respectively.

With the aid of various methods of digital image preprocessing, it is possible to obtain from such an image, which can be understood as a two-dimensional matrix of pixels, prominent points in the image plane which are also referred to as feature points. FIG. 1 shows a three-dimensional cuboid with visible corner points 1, 2, . . . , 7 which is projected into the two-dimensional image plane, whose coordinate axes are denoted by q and p. Finding the corner points of the cuboid in the image plane with the aid of suitable methods of digital image preprocessing makes the two-dimensional coordinates available for positional estimation or object detection. An overview of the methods available for feature extraction is to be found in Y. Shirai (1987). The images of object corner points are chiefly suitable as feature points. These object corner points can be found in the image plane in an advantageous way as points of intersection of object edges. This reduces the problem of locating corner points in the image plane to the detection of edges. A number of methods are available for detecting object edges in the image plane, of which the most important are based on edge operators or on the Hough transformation (Y. Shirai 1987).

In order in this way to be able to interpret preprocessed digital images as objects, it is necessary to find the correct assignment between the points of a corresponding object model and the feature points in the image plane. This problem is considerably compounded by the unknown position and unknown spatial orientation of the projected objects. For this reason, a knowledge-based and model-based interpretation of the preprocessed images must be preceded by suitable positional estimation, the aim of which is the determination of position parameters of the projected object, that is to say of rotation parameters and, possibly, of a displacement.

The solution of this problem according to the invention utilizes the method of adaptive vector quantization, which is also referred to as the Kohonen network. Since this is an adaptive method, the technical application of this method presupposes a suitable learning method. Such a learning method is therefore described below with reference to FIG. 3. Carrying out this learning method requires a space grid of neurons, that is to say a totality RG, indexable with whole numbers i, of reference patterns m(i), each index i of the totality being assigned a grid point (i(1), i(2), i(3)) with whole numbers i(1), i(2) and i(3) in a reversible unique fashion. Given a prescribed master vector v, each neuron, that is to say each element i of the totality, assigns to the reference pattern m(i) of this vector with the aid of an output function a(v, m) which is identical for all neurons, an output value a(v, m(i)) belonging to it. At the start of the learning process, the values of all the reference patterns m(i) are chosen entirely randomly.

In order to be able with the aid of such a Kohonen network to carry out positional estimation, each neuron i is assigned an interpretation $x(i)=(x(i, 1), \ldots, x(i, N))$. At the start of the learning process, that is to say the adaptation of the reference patterns, the values of the components of all the interpretations x(i) are likewise chosen entirely randomly. In this context, the components of the interpretations x(i) correspond to the position parameters to be estimated of the projected object.

In order to carry out the adaptation, a time-dependent learning rate L(t) is prescribed which decreases monotonically with time. This learning rate determines the rate of the learning process and becomes smaller the further advanced the learning process is. In experimental investigations of the method according to the invention, a learning rate function of the form $$L(t) = L(\text{start}) \cdot \exp\left( \frac{t}{t(\text{end})} \ln\left( \frac{L(\text{end})}{L(\text{start})} \right) \right) \quad (2)$$

has proved to be advantageous.

In this case, L(start), L(end) and t(end) denote a prescribed initial learning rate, a prescribed final learning rate and a final instant of the learning process. Furthermore, a coupling strength function h(i, j, t) is prescribed, which assigns to two points (i(1), i(2), i(3)), (j(1), j(2), j(3)) on the grid in each case a coupling strength h which decreases monotonically with the spacing of the grid points and monotonically with time. Experimental investigations have shown that a particularly advantageous selection of the coupling strength function is given by $$h(i, j, t) = \exp\left( -\frac{\|i - j\|^2}{2 \cdot S^2(t)} \right) \text{ where} \quad (3)$$

$$S(t) = S(\text{start}) \cdot \exp\left( \frac{t}{t(\text{end})} \ln\left( \frac{S(\text{end})}{S(\text{start})} \right) \right)$$

In this case, s(t) denotes the instantaneous range of the coupling strength function h, and the symbols s(start) and s(end) denote prescribed initial and final ranges respectively of the coupling strength function.

This choice of coupling strength function ensures that the coupling strength between two neurons decreases monotonically with the spacing between these neurons and that for a given spacing the coupling strength decreases monotonically with time. As a result, the coupling between adjacent neurons on the grid becomes continually shorter in range with advancing time and continually weaker for a given spacing. It is advantageous to choose the Euklidian spacing as a measure of the spacing between the neurons.

After the parameters of the learning method have been prescribed, the actual learning method now begins. Each time step t is prescribed a training master vector $v(t)=(v(1, t), \ldots v(M, t))$ which is formed from two-dimensional coordinates of feature points in the image, and position parameters $XT(t)=(XT(1, t), \ldots, XT(N, t))$ assigned to this training master vector. At each time step t, the output function a(v, m) which is identical for all the neurons, is now used to calculate from this prescribed training master vector v(t) and the instantaneous values of the reference patterns $m(i, t)=m(i, 1, t), \ldots m(i, M, t))$ the instantaneous output values $a(i, t)=a(v(t), m(i, t))$ for each index i. This output value is a measure of the similarity between the instantaneous value of the reference pattern m(i, t) of the neuron i and the applied training master vector v(t). In order to determine that neuron in the totality of neurons whose reference pattern m is most similar to the applied training master vector, that index w(t) is sought whose associated output value a(w, t) is optimum.

After determination of the optimum output value and of the index w(t) belonging to it, the actual adaptation step belonging to this instant t is carried out: the instantaneous values of the reference patterns m(i, t) of all the neurons i and the associated position parameters x(i, t) are adapted with the aid of the relationships $$m(i, t+1) = m(i, t) + L(t) \cdot h(i, w, t) \cdot (v(t) - m(i,t)) \quad (5)$$

$$x(i, t+1) = x(i, t) + L(t) \cdot h(i, w, t) \cdot (XT(t) - x(i, t)). \quad (6)$$

The adaptation relationships (5) and (6) ensure that the distribution of the values of the reference patterns becomes ever more similar to the statistical distribution of the training master vectors in the course of the learning process, and that the relationships, corresponding to the training master vectors and their associated position parameters, between the master vectors and position parameters are reflected by the relationship occurring during the adaptation between the position parameters of the neurons and the associated reference patterns. The choice of a suitable output function a(v, m) is decisive in order to optimize the convergence of the learning method. Various experimental investigations have shown that chiefly two different possible choices of the output function a(v, m) lead to optimum efficiency of the process. The first possible choice is the square of the Euklidian spacing between the master vector and the reference pattern vector of a neuron, $$a(v, m(i)) = \|v - m(i)\|^2 = \sum_{k=1}^{M} (v(k) - m(i, k))^2.$$

It now follows from the relationships (5), (6) and (7) that by minimizing the output values when determining the optimum output value a(m, t) the convergence of the learning process can be ensured in the sense of an adaptive vector quantization.

In such cases, in which the Euklidian norm of the master vectors is constant, it is advantageous to work with normalized reference patterns m(i). In this case, instead of the Euklidian spacing it is possible to choose another output function which is given by $$a(v, m(i)) = \sum_{k=1}^{M} m(i, k) \cdot v(k). \quad (8)$$

When the output function according to equation (8) is used, the optimum output value is the maximum output value.

This is bound up with the fact that the master vector with the components $v(k), k=1, \ldots, M$ becomes more similar to the reference pattern m(i) with the components $m(i,k), k=1, \ldots, m$, the larger the skalar product, given by equation (8), of the master vector v and the reference pattern m.

Figure 2:
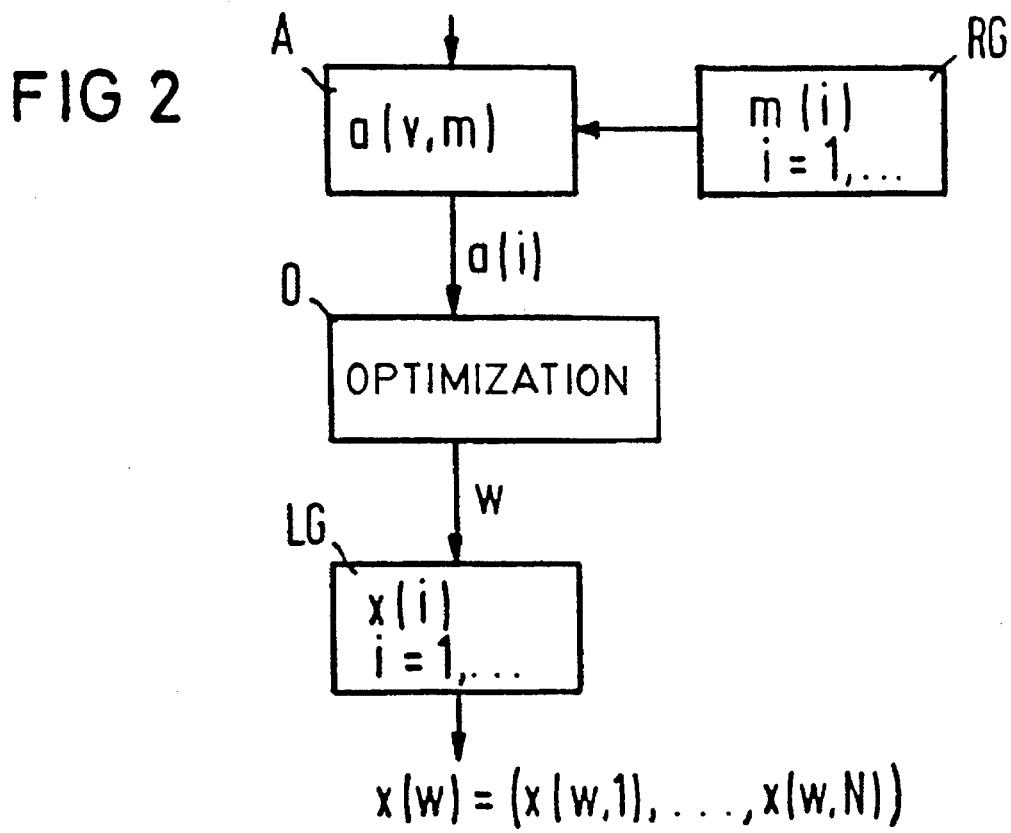
FIG. 2 shows a flow diagram of the method for positional estimation and for object detection in conjunction with simultaneous positional estimation.

Once the learning method is concluded, the trained neuron network (or, in other words, the adapted totality of reference patterns) can be used for the positional estimation of three-dimensional objects. For this purpose, feature points are extracted from a given two-dimensional image of a three-dimensional object using the methods already described for preprocessing digital images (Y. Shirai 1987), and the two-dimensional coordinates of these feature points are combined to form a master vector v. This can preferably be performed by choosing the components v(k) of the master vector v in the form $$v(k)=(p(k), q(k)) \quad k=1, \ldots, M \tag{9}$$

p(k) and q(k) being the two-dimensional coordinates of the feature point k in the image plane (FIG. 1). In order to estimate the spatial position of the three-dimensional object represented by this master vector v, output value a(i)=a(v, m(i)) is now calculated in accordance with FIG. 2 for each index i of the totality of the neurons. Thereupon, the index w of that neuron is sought which has delivered the optimum output value a(w). The components of the interpretation x(w) of this neuron with the index w can now be regarded as the optimum estimation of the position parameters of the object represented by the master vector v.

The quality of this estimation can, however, be further noticeably improved if instead of the interpretation x(w) of the optimum neuron with the index w an interpolated interpretation is used for the positional estimation. Such an interpolated interpretation can be described as follows:

As a consequence of the special characteristics of the reference pattern adaptation already described, there are situated in the immediate vicinity of the optimum neuron with the index w other neurons whose reference patterns are likewise similar to the applied master vector v, even though the output values belonging to these neurons are only suboptimum. Guided by the idea that the possible master vectors v form a continuum of vectors in an M-dimensional space, it can be assumed in general that it is possible to find a reference pattern vector by interpolation between the reference pattern vectors of the neurons in the immediate vicinity of the neuron with optimum output value.

The following steps are carried out in order to carry out this interpolation:

An environment U of the neuron w with optimum output value a(w) is chosen, which preferably consists of the nearest neighbors of the neuron w with optimum output value. Subsequently, the convex linear combination $$m(w,u,b)=b \cdot m(w)+(1-b) \cdot m(u) \tag{10}$$

is formed for each neuron u of this environment U. In this case, b is a number between 0 and 1. A parameterized output function a(v,m(w,u,b)) is calculated for this interpolated reference pattern vector m(w,u,b) parameterized by b, which output function is likewise parameterized by b. It is preferable to use once again one of the two forms specified in equations (7) and (8), respectively, as output function. Because of the simple analytical form of the described output functions, it is possible to make a concerted effort to find an optimum value of the output function parameterized by b as a function of b. This optimum value of b is denoted for each neuron u of the environment by b(u). This yields for all the neurons of the environment a numerical value b(u) between 0 and 1 and an interpolated reference pattern m(w,u,b(u)) belonging thereto. The optimum interpolated reference pattern is now found among these interpolated reference patterns by calculating the associated output values a(v,m(w,u,b(u)) for all the interpolated reference patterns m(w,u,b(u)) of all the neurons u of the environment. The optimum and thus improved interpolated reference pattern vector m(w, opt) is now yielded as that reference pattern vector with optimum associated output value a(v, m(w,u,b(u)). Denoting the interpolation coefficient belonging to this reference pattern by b(opt), an improved positional estimation x is yielded according to the formula $$x=b(opt) \cdot x(w)+(1-b(opt)) \cdot x(opt) \tag{11}$$

x(opt) being the interpretation belonging to the neuron with optimum interpolated reference pattern.

Experimental investigations have shown that it was possible to improve the accuracy of positional estimation by approximately 85% by using the interpolation method described here.

An even further-reaching improvement in positional estimation can be achieved by another type of interpolation: For this purpose, all the reference patterns m(u) with u from a prescribed environment U of b are used to form the convex linear combination $$m = \sum_{u \in U} b(u) \cdot m(u) \tag{12}$$

$$= b(w) \cdot m(w) + \sum_{u \neq w} b(u) \cdot m(u) \tag{13}$$

where $$\sum_{u \in U} b(u) = b(w) + \sum_{u \neq w} b(u) = 1 \tag{14}$$

and $$0 \leq b(u), b(w) \leq 1. \tag{15}$$

A search is subsequently made for the optimum of the function a(v,m) as a function of the coefficients b(u) and b(w). The optimum coefficients b(u, opt) and b(w, opt) are then used to calculate the interpolated positional estimate as $$x = \sum_{u \in U} b(u, opt) \cdot x(u) \tag{16}$$

$$= b(w, opt) \cdot x(w) + \sum_{u \neq w} b(u, opt) \cdot x(u) \tag{17}$$

The substantial insensitivity of the method for positional estimation with respect to errors in the determination of the coordinates of feature points can be further improved by using instead of the output function (7) the output function $$a(v, m(i)) = \sum_{k=1}^{M} g(v, k) \cdot (v(k) - m(i, k))^2 \tag{18}$$

in which the weights g(v,k) are a measure of the reliability or accuracy of the values of the components v(k) of the master vector v. It is expedient for this purpose to write g(v,k)=1 if v(k) is present without uncertainty, and g(v,k)=0 if the value of v(k) is unknown. g(v,k) lies between 0 and 1 for all cases between these extremes.

The method described here can still be applied successfully even when the aim is not only to estimate the spatial position and orientation of a known object, but the aim in addition is to determine simultaneously with the position and orientation of this object in space the identity of an object, which is unknown a priori and is taken from a known set of objects. In order to widen the described method by this scope of performance, a further component, which corresponds to the object identity, is to be added to the components of the interpretations which correspond to the position parameters to be estimated. When carrying out the learning method, it is then necessary to specify the relevant object identity for each training master vector in addition to the position parameters belonging to this training master vector. After completion of the learning method thus carried out, the neuron network is thus capable of determining the object identity in addition to the unknown position parameters.

However, it is to be borne in mind in this connection that when using the interpolation methods only the components of the interpretations corresponding to the position parameters are interpolated, since a linear combination of object characteristics is meaningless.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for estimating position parameters of an object in space from a two-dimensional image using a Kohonen network having neurons, comprising the steps of:
a) prescribing indexable weighting vectors $m(i)=(m(i,1), \ldots, m(i,M))$ of a dimension M and positional parameters $x(i)=(x(i,1), \ldots, x(i,N))$ of a dimension N, allocated to the weighting factors, by whole numbers i that unambiguously identify each neuron i of the Kohonen network;
b) forming a pattern vector $v=(v(1), \ldots, v(k), \ldots, v(M))$ from two-dimensional coordinates p(k), g(k) of feature points in the image, whereby v(k) describes a respective feature point in the image in a respective form $v(k)=(p(k), q(k))$;
c) applying the pattern vector $v=(v(1), \ldots v(k), \ldots, v(M))$ to each neuron i of the Kohonen network;
d) calculating a respective output value $a(i)=a(v,m(i))$ for the applied pattern vector $v=(v(1), \ldots, v(k), \ldots, v(M))$ in each neuron i of the Kohonen network; and
e) deriving sought positional parameters from respective positional parameters $x(i)=(x(i,1), \ldots, x(i,N))$ allocated to a neuron i having an optimum output value $a(v,m(i))$.

2. The method according to claim 1 for object detection in conjunction with simultaneous estimation of position parameters of an object in space from a two-dimensional image using a Kohonen network having neurons, wherein the method further comprises using, in addition to the positional parameters, object identities for recognition of objects in the step of adapting.

3. The method as claimed in claim 1, wherein the output values a(i) are calculated using the relationship $$a(v, m(i)) = \|v - m(i)\|^2 = \sum_{k=1}^{M} (v(k) - m(i, k))^2$$

from the pattern vector v and the weighting vectors m(i), and wherein minimum output values are optimal.

4. The method as claimed in claim 1, wherein the output values a(i) are calculated using the relationship $$a(v, m(i)) = \sum_{k=1}^{M} g(v, k) \cdot (v(k) - m(i, k))^2$$

from the pattern vector v and the weighting factors m(i), weights g(v, k) being a measure of reliability of values of the components v(k) of the pattern vector v, and minimum output values being optimal.

5. The method as claimed in claim 1, wherein the output values a(i) are calculated using the relationship $$a(v, m(i)) = \sum_{k=1}^{M} m(i, k) \cdot v(k)$$

from the pattern vector v and the weighting factors m(i), and wherein maximum output values are optimal.

6. The method as claimed in claim 1, wherein said position parameters include rotational angles referenced to three axes of a spatial coordinate system.

7. A method for estimating position parameters of an object in space from a two-dimensional image using a Kohonen network having neurons, comprising the steps of:
a) prescribing indexable weighting vectors $m(i)=(m(i,1), \ldots, m(i,M))$ of a dimension M and positional parameters $x(i)=(x(i,1), \ldots, x(i,N))$ of a dimension N, allocated to the weighting factors, by whole numbers i that unambiguously identify each neuron i of the Kohonen network;
b) forming a pattern vector $v=(v(1), \ldots, v(k), \ldots, v(M))$ from two-dimensional coordinates p(k), g(k) of feature points in the image, whereby v(k) describes a respective feature point in the image in a respective form $v(k)=(p(k), q(k))$;
c) applying the pattern vector $v=(v(1), \ldots v(k), \ldots, v(M))$ to each neuron i of the Kohonen network;
d) calculating a respective output value $a(i)=a(v,m(i))$ for the applied pattern vector $v=(v(1), \ldots, v(k), \ldots, v(M))$ in each neuron i of the Kohonen network;
e) deriving sought positional parameters from respective positional parameters $x(i)=(x(i,1), \ldots, x(i,N))$ allocated to a neuron i having an optimum output value $a(v,m(i))$;
f) calculating an optimum of a function $$A(u,b)=a(v,b \cdot m(w)+(1-b) \cdot m(u))$$

of a real variable b with $0 \leq b \leq 1$ for all grid points u in a predetermined environment U of a grid point w that is determined by the neuron i having the optimum output value $a(v,m(i))$;
g) identifying a grid point, opt, for which A(opt,b(opt)) is optimum among all A(u,b(u)) for all grid points u of the environment in the grid point w, whereby b(u) identifies the position of the optimum of A(u,b) as a function of b in an interval $0 \leq b \leq 1$; and
h) deriving the sought positional parameters x(i) from the relationship $$x(i)=b(opt) \cdot x(w)+(1-b(opt)) \cdot x(opt)$$

as a convex linear combination from positional parameters of two grid points.

8. The method as claimed in claim 7, wherein the output values a(i) are calculated using the relationship $$a(v, m(i)) = \|v - m(i)\|^2 = \sum_{k=1}^{M} (v(k) - m(i, k))^2$$

from the pattern vector v and the weighting vectors m(i), and wherein minimum output values are optimal.

9. The method as claimed in claim 7, wherein the output values a(i) are calculated using the relationship $$a(v, m(i)) = \sum_{k=1}^{M} g(v, k) \cdot (v(k) - m(i, k))^2$$

from the pattern vector v and the weighting factors m(i), weights g(v, k) being a measure of reliability of values of the components v(k) of the pattern vector v, and minimum output values being optimal.

10. The method as claimed in claim 7, wherein the output values a(i) are calculated using the relationship $$a(v, m(i)) = \sum_{k=1}^{M} m(i, k) \cdot v(k)$$

from the pattern vector v and the weighting factors m(i), and wherein maximum output values are optimal.

11. The method as claimed in claim 7, wherein said position parameters include rotational angles referenced to three axes of a spatial coordinate system.

12. The method as claimed in claim 7, wherein the method further comprises using, in addition to the positional parameters, object identities for recognition of objects in the step of adapting.

13. A method for estimating position parameters of an object in space from a two-dimensional image using a Kohonen network having neurons, comprising the steps of:
a) prescribing indexable weighting vectors m(i)=(m(i,1), . . . , m(i,M)) of a dimension M and positional parameters x(i)=(x(i,1), . . . , x(i,N)) of a dimension N, allocated to the weighting factors, by whole numbers i that unambiguously identify each neuron i of the Kohonen network;
b) forming a pattern vector v=(v(1), . . . , v(k), . . . , v(M)) from two-dimensional coordinates p(k), g(k) of feature points in the image, whereby v(k) describes a respective feature point in the image in a respective form v(k)=(p(k), q(k));
c) applying the pattern vector v=(v(1), . . . , v(k), . . . , v(M)) to each neuron i of the Kohonen network;
d) calculating a respective output value a(i)=a(v,m(i)) for the applied pattern vector v=(v(1), . . . , v(k), . . . , v(M)) in each neuron i of the Kohonen network;
e) deriving sought positional parameters from respective positional parameters x(i)=(x(i, 1), . . . , x(i,N)) allocated to a neuron i having an optimum output value a(v,m(i));
f) calculating an optimum of a function $$A(b(u), b(w)) = a\left( v, b(w) \cdot m(w) + \sum_{u \neq w} b(u) \cdot m(u) \right)$$

of a real variable b in an interval $0 \leq b \leq 1$ for all grid points u in a predetermined environment U of a grid point w that is determined by the neuron i having the optimum output value a(v,m(i)); and
g) deriving the sought positional parameters x(i) from the relationship $$x(i) = b(w, opt) \cdot x(w) + \sum_{u \neq w} b(u, opt) \cdot x(u)$$

as a convex linear combination of positional parameters x(w) and x(u).

14. The method as claimed in claim 13, wherein the output values a(i) are calculated using the relationship $$\begin{aligned} a(v, m(i)) &= \|v - m(i)\|^2 \\ &= \sum_{k=1}^{M} (v(k) - m(i, k))^2 \end{aligned}$$

from the pattern vector v and the weighting vectors m(i), and wherein minimum output values are optimal.

15. The method as claimed in claim 13, wherein the output values a(i) are calculated using the relationship $$a(v, m(i)) = \sum_{k=1}^{M} g(v, k) \cdot (v(k) - m(i, k))^2$$

from the pattern vector v and the weighting factors m(i), weights g(v, k) being a measure of reliability of values of the components v(k) of the pattern vector v, and minimum output values being optimal.

16. The method as claimed in claim 13, wherein the output values a(i) are calculated using the relationship $$a(v, m(i)) = \sum_{k=1}^{M} m(i, k) \cdot v(k)$$

from the pattern vector v and the weighting factors m(i), and wherein maximum output values are optimal.

17. The method as claimed in claim 13, wherein said position parameters include rotational angles referenced to three axes of a spatial coordinate system.

18. The method as claimed in claim 13, wherein the method further comprises using, in addition to the positional parameters, object identities for recognition of objects in the step of adapting.

19. A method for adapting weighting vectors for estimating positional parameters of an object in space from a two-dimensional image using a Kohonen network having neurons, the neurons i forming a grid, comprising the steps of:
a) prescribing indexable weighting vectors m(i)=(m(i,1), . . . , m(i,M)) of a dimension M and positional parameters x(i)=(x(i,1), . . . , x(i,N)) of a dimension N, allocated to the weighting factors, by whole numbers i that unambiguously identify each neuron i of the Kohonen network;
b) for every time t of the adaptation,
b1) prescribing a learning rate L(t) that monotonously decreases with time;
b2) prescribing a degree of coupling factor h(i,j,t) that allocates a degree of coupling that decreases monotonously with spacing of points of the grid and monotonously with time to two respective points (i(1),i(2),i(3), (j(1),j(2),j(3)) on the grid that is formed by the neurons i of the Kohonen network;
b3) prescribing a training pattern vector v(t)=(v(1,t), . . . , v(M, t)) of dimension M that is formed of two-dimensional coordinates of feature points in the image and positional parameters XT(t)=(XT(1,t), . . . , XT(N, t)) associated with said training pattern vector;
b4) calculating momentary output values a(i,t)=a(v(t), m(i,t)) at time t for each neuron i from the prescribed training pattern vector v(t) and from momentary weighting vectors m(i,t) at time t;
b5) calculating a neuron i with optimum output value a(v,m(i)), said neuron i having an associated grid point w;
b6) adapting weighting vectors m(i,t) of every neuron i using the relationships $$m(i,t+1)=m(i,t)+L(t)\cdot h(i,w,t)\cdot(v(t)-m(i,t))$$

$$x(i,t+1)=x(i,t)+L(t)\cdot h(i,w,t)\cdot(XT(t)-x(i,t)).$$

20. The method according to claim 5, wherein object identities for recognition of objects are additionally taken into consideration in the adaptation.

21. The method as claimed in claim 19, wherein the method further comprises using a learning rate L(t) of a form $$L(t) = L(\text{start}) \cdot \exp\left( \frac{t}{t(\text{end})} \ln\left( \frac{L(\text{end})}{L(\text{start})} \right) \right)$$

with prescribed initial and final learning rates L(start) and L(end) respectively, up to a final instant t(end) of the adaptation.

22. The method according to claim 19, wherein the method further comprises using a coupling strength function h(i, j, t) of a form $$h(i, j, t) = \exp\left( -\frac{\|i - j\|^2}{2 \cdot S^2(t)} \right) \text{ where}$$

$$S(t) = S(\text{start}) \cdot \exp\left( \frac{t}{t(\text{end})} \ln\left( \frac{S(\text{end})}{S(\text{start})} \right) \right)$$

and with prescribed initial and final ranges s(start) and s(end), respectively, up to a final instant t(end) of the adaptation.

23. The method as claimed in claim 19, wherein the pattern vectors v=(v(1), ..., v(M)) in the form of v(k)=(p(k), q(k)) are formed from two-dimensional coordinates p(k), q(k) of feature points k=1, ..., M in the image.

24. The method as claimed in claim 19, wherein the output values a(i) are calculated using the relationship $$a(v, m(i)) = \|v - m(i)\|^2 = \sum_{k=1}^{M} (v(k) - m(i, k))^2$$

from the pattern vector v and the weighting vectors m(i), and wherein minimum output values are optimal.

25. The method as claimed in claim 19, wherein the output values a(i) are calculated using the relationship $$a(v, m(i)) = \sum_{k=1}^{M} g(v, k) \cdot (v(k) - m(i, k))^2$$

from the pattern vector v and the weighting factors m(i), weights g(v, k) being a measure of reliability of values of the components v(k) of the pattern vector v, and minimum output values being optimal.

26. The method as claimed in claim 19, wherein the output values a(i) are calculated using the relationship $$a(v, m(i)) = \sum_{k=1}^{M} m(i, k) \cdot v(k)$$

from the pattern vector v and the weighting factors m(i), and wherein maximum output values are optimal.

27. The method as claimed in claim 19, wherein said position parameters include rotational angles referenced to three axes of a spatial coordinate system.

* * * * *